(12) United States Patent  
Chien

(10) Patent No.: US 7,956,963 B2  
(45) Date of Patent: Jun. 7, 2011

(54) PIXEL STRUCTURE FOR TRANSFLECTIVE LCD PANEL HAVING A REFLECTIVE STRUCTURE FORMED IN A DEPRESSION ON THE TFT SUBSTRATE

(75) Inventor: Liang-Neng Chien, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/487,998

(22) Filed: Jun. 19, 2009

(65) Prior Publication Data

US 2009/0256152 A1 Oct. 15, 2009

Related U.S. Application Data

(62) Division of application No. 11/444,576, filed on May 31, 2006, now abandoned.

(30) Foreign Application Priority Data

Sep. 9, 2005 (TW) .............................. 94131048 A

(51) Int. Cl.  
G02F 1/1335 (2006.01)  
G02F 1/136 (2006.01)

(52) U.S. Cl. ............. 349/114; 349/42; 349/43; 349/113

(58) Field of Classification Search .................. 349/114, 349/42, 43, 113  
See application file for complete search history.

(56) References Cited

U.S. PATENT DOCUMENTS

2003/0123001 A1* 7/2003 Ha et al. ......................... 349/113  
2003/0184705 A1* 10/2003 Murade et al. ................ 349/158  
2004/0207784 A1* 10/2004 Lim et al. ....................... 349/114

* cited by examiner

Primary Examiner — David Nelms  
Assistant Examiner — Lauren Nguyen  
(74) Attorney, Agent, or Firm — J.C. Patents

(57) ABSTRACT

A pixel structure for a transflective LCD having a transparent region and a reflective region is provided. The pixel structure includes a transparent substrate, a TFT, at least one reflective structure, a passivation layer, a pixel electrode and a reflective layer. The TFT is disposed in a reflective region of the transparent substrate. The reflective structure is configured at one side of the TFT, and located in the reflective region of the transparent substrate. The passivation layer is disposed over the transparent substrate and covers the TFT and the reflective structure. The pixel electrode is disposed above the TFT and the reflective structure, and is at least located in a transparent region. The pixel electrode is electrically connected to the TFT. The reflective layer is disposed above the TFT and the reflective structure, and is located in the reflective region.

4 Claims, 10 Drawing Sheets

PIXEL STRUCTURE FOR TRANSFLECTIVE LCD PANEL HAVING A REFLECTIVE STRUCTURE FORMED IN A DEPRESSION ON THE TFT SUBSTRATE

CROSS-REFERENCE TO RELATED APPLICATION

This is a divisional application of, and claims priority benefit of patent application Ser. No. 11/444,576, filed on May 31, 2006, which claims the priority benefit of Taiwan application serial no. 94131048, filed on Sep. 9, 2005. The entirety of each of the above-mentioned patent applications is hereby incorporated by reference herein and made a part of this specification.

BACKGROUND OF THE INVENTION

1. Field of the Invention

The present invention relates to a pixel structure, and particularly to a pixel structure for a transflective thin film transistor (TFT) liquid crystal display (LCD) for improving efficiency in backlight utilization.

2. Description of Related Art

Since the first cathode ray tube (CRT) television was invented, display technology has developed rapidly. However, CRT displays have obvious disadvantages such as large size, heavy weight, high radiation and poor pixel quality, and therefore various flat display panels are explored and introduced. Among them, LCDs, with advantages such as compact size, power consumption, no radiation, full color display, and portability, have become the most developed and popular products. LCDs are used in various applications including cellular phone, electronic dictionary, digital camera, digital camcorder, personal digital assistant, notebook computer and desktop computer.

TFT LCDs can be generally categorized into transmissive type, reflective type and transflective type, according to the light source and array substrates used. A typical transmissive TFT LCD uses a backlight source, and employs transparent electrodes as pixel electrodes of the TFT array substrate for allowing backlights to transmit through. A typical reflective TFT LCD uses a front-light source and/or ambient lights as a light source, and employs metal or other reflective material as reflective electrodes for reflecting the front-lights or the ambient lights. A typical transflective TFT LCD can be viewed as a combination of a transmissive TFT LCD and a reflective TFT LCD, taking advantages of the backlight source and the front-light source or the ambient lights for display.

In the conventional transflective TFT LCDs, the reflective layers are usually designed to have rough surfaces for obtaining widely distributed reflected lights. However, the process to make the surfaces rough increases production costs. Further, when the backlight source provides backlights for display, only those radiating on the transparent electrodes rather than those radiating on the reflective layer can be used. Therefore, such a conventional transflective TFT LCD has lower utilization efficiency of lights provided by the backlight module.

SUMMARY OF THE INVENTION

Therefore, an object of the invention is to provide a pixel structure for a transflective TFT LCD panel, adapted for improving efficiency in backlights utilization of the TFT LCD.

Another object of the invention is to provide a method for fabricating a transflective TFT LCD panel having higher efficiency in backlights utilization.

According to the foregoing objects and others, the present invention provides a pixel structure for a transflective TFT LCD. The pixel structure includes a transparent substrate, a TFT, at least one reflective structure, a passivation layer, a pixel electrode and a reflective layer. The TFT is disposed in a reflective region of the transparent substrate. The reflective structure is configured at one side of the TFT and located in the reflective region of the transparent substrate. The passivation layer is disposed over the transparent substrate and covers the TFT and the reflective structure. The pixel electrode is disposed above the TFT and the reflective structure, and at least is located in a transparent region. The pixel electrode is electrically connected to the TFT. The reflective layer is disposed above the TFT and the reflective structure, and is located in the reflective region.

According to an embodiment of the pixel structure for a transflective TFT LCD panel, the TFT includes a gate electrode, a gate insulating layer, a semiconductor layer and a source/drain electrode. The gate electrode is disposed on the transparent substrate. The gate insulating layer is also disposed over the transparent substrate and covers the gate electrode. The semiconductor layer is disposed on the gate insulating layer and above the gate electrode. The source/drain electrode is disposed on the semiconductor layer and above the gate electrode.

According to an embodiment of the pixel structure for a transflective TFT LCD panel, the reflective structure includes a first metallic layer. The first metallic layer and the gate electrode are of a same film layer, for example. The first metallic layer is lodged into a depression of or protrudes from the transparent substrate surface, for example. Furthermore, the gate insulating layer extends outside the TFT for example, and covers the first metallic layer.

According to an embodiment of the pixel structure for a transflective TFT LCD panel, the first metallic layer and the source/drain electrode for example are of a same layer. The gate insulating layer for example extends outside the TFT and is disposed between the first metallic layer and the transparent substrate. The first metallic layer for example is lodged in a depression of the gate insulating layer surface.

According to an embodiment of the pixel structure for a transflective TFT LCD panel, the reflective structure for example further includes a second metallic layer. The second metallic layer is disposed on the first metallic layer. The first metallic layer and the gate electrode for example are of a same film layer, and the second metallic layer and the source/drain electrode for example are of a same layer. Furthermore, the gate insulating layer for example extends outside the TFT, and the gate insulating layer for example is disposed between the first metallic layer and the second metallic layer.

According to an embodiment of the pixel structure for a transflective TFT LCD panel, the reflective structure is saw-tooth-shaped or block-shaped.

According to an embodiment of the invention, the pixel structure for a transflective TFT LCD panel further includes a flatting layer, disposed between the pixel electrode and the transparent substrate, and covering the TFT and the reflective structure.

The present invention further provides a method for fabricating a pixel structure for a transflective LCD panel. The fabricating method includes the steps of: providing a transparent substrate; then forming a TFT and configuring a reflective structure on the transparent substrate, wherein the reflective structure is located at one side of the TFT; forming a passivation layer over the transparent substrate, wherein the passivation layer covers the TFT and the reflective structure; forming a pixel electrode above the TFT and the reflective structure, wherein the pixel electrode and the TFT are electrically connected to each other; then forming a reflective layer above the TFT and the reflective structure.

According to an embodiment of the method for fabricating a pixel structure for a transflective LCD panel, the step of forming a reflective structure for example includes forming a first metallic layer on the transparent substrate, wherein the first metallic layer for example is formed simultaneously with the gate electrode. Further, before the first metallic is formed, a lithographic process and an etching process are performed on the transparent substrate to form a first depression, the first depression being adapted for receiving the first metallic layer. Also, the gate insulating layer for example covers the first metallic layer.

According to an embodiment of the method for fabricating a pixel structure for a transflective LCD panel, the method of forming a reflective structure for example is by forming a first metallic layer on the transparent substrate, simultaneously with the gate electrode. Further, before forming the first metallic layer, the method includes conducting a lithographic process and an etching process to form a first depression for receiving the metallic layer therein; and thereafter, forming the gate insulating layer covering the first metallic layer.

According to an embodiment of the method for fabricating a pixel structure for a transflective LCD panel, the first metallic layer for example is formed simultaneously with the source/drain electrode. Further, before the first metallic layer is formed, a lithographic process and an etching process are performed on the gate insulating layer to form a second depression, the second depression being adapted for receiving the first metallic layer.

According to an embodiment of the method for fabricating a pixel structure for a transflective LCD panel, the step of forming a reflective structure for example further includes forming a second metallic layer above the first metallic layer. The first metallic layer for example is simultaneously formed with the gate electrode, and the second metallic layer for example is simultaneously formed with the source/drain electrode. Further, before the first metallic layer and the gate electrode are formed, a lithographic process and an etching process are performed on the transparent substrate to form a first depression, the first depression being adapted for receiving the first metallic layer. Furthermore, after the gate insulating layer is formed and before the second metallic layer is formed, a lithographic process and an etching process are performed on the gate insulating layer to form a second depression, the second depression being adapted for receiving the second metallic layer.

According to an embodiment of the invention, after the passivation layer is formed and before the pixel electrode is formed, a flatting layer is formed for covering the TFT and the reflective structure.

When forming a TFT, a reflective structure is simultaneously formed on at least one side of the TFT. There is no extra processing needed to form the reflective structure. Further, this reflective structure is adapted for improving efficiency in backlights utilization of the TFT LCD.

BRIEF DESCRIPTION OF THE DRAWING

The features of the invention which are believed to be novel are set forth with particularity in the appended claims. The invention, together with its objects and the advantages thereof, may be best understood by reference to the following description taken in conjunction with the accompanying drawings, in which like reference numerals identify like elements in the figures.

DESCRIPTION OF THE EMBODIMENTS

Figure 1A:
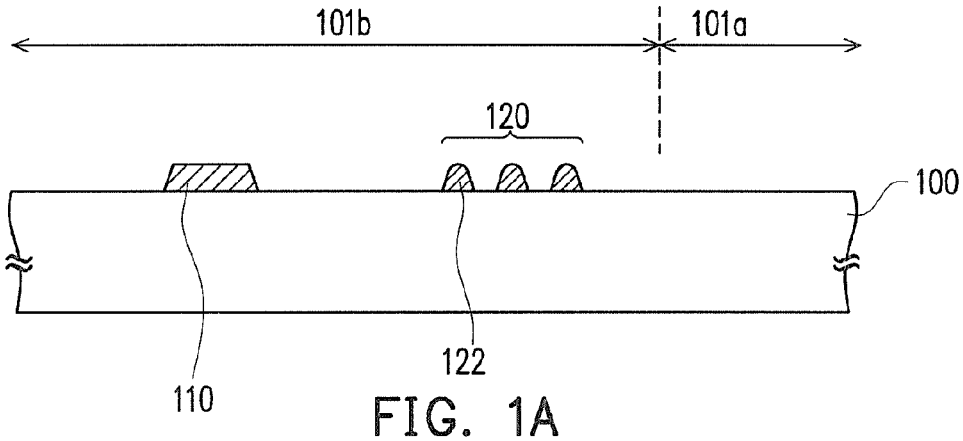
FIGS. 1A through 1E schematically illustrate a flow chart of fabricating a pixel structure for a transflective LCD panel, according to the first embodiment of the invention.

Reference will now be made in detail to the present embodiments of the invention, examples of which are illustrated in the accompanying drawings. Wherever possible, the same reference numbers are used in the drawings and the description to refer to the same or like parts.

The following embodiments illustrate different types of pixel structures for a transflective LCD. The pixel structure mainly includes a transparent substrate, a TFT, at least one reflective structure, a pixel electrode and a reflective layer. The TFT is disposed on the transparent substrate, and is located in a reflective region. The reflective structure is configured at one side of the TFT on the transparent substrate, and located in the reflective region. The pixel electrode is disposed above the TFT and the reflective structure, and at least is located in a transparent region. The pixel electrode is electrically connected to the TFT. The reflective layer is disposed above the TFT and the reflective structure, and is located in the reflective region. Detailed structures accompanying with the manufacturing process thereof will be described in the following embodiments.

The First Embodiment

FIGS. 1A through 1E schematically illustrate a flow chart of fabricating a pixel structure for a transflective LCD panel, according to the first embodiment of the invention. First, the step shown in FIG. 1A, includes providing a transparent substrate 100, and simultaneously forming a gate electrode 110 and a metallic layer 122 on the transparent substrate 100, wherein the metallic layer 122 is formed at one side of the gate electrode 110 for configuring a reflective structure 120. According to the first embodiment, the reflective structure 120 for example can be either sawtooth-shaped or block-shaped. Further, the transparent substrate 100 for example is a glass substrate. The reflective structure 120 and the gate electrode 110 are made of a same material.

Figure 1B:
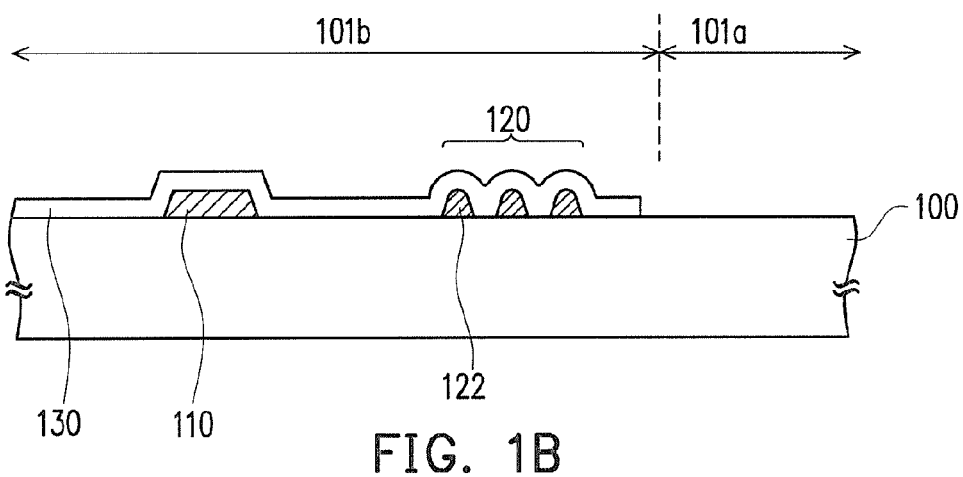

Then, the following step shown in FIG. 1B includes forming a gate insulating layer 130 over the transparent substrate 100 in a chemical vapor deposition (CVD) method, for example, wherein the gate insulating layer 130 covers the gate electrode 110 and the reflective structure 120. The gate insulating layer 130 for example is made of silicon dioxide, silicon nitride or silicon oxynitride.

Figure 1C:
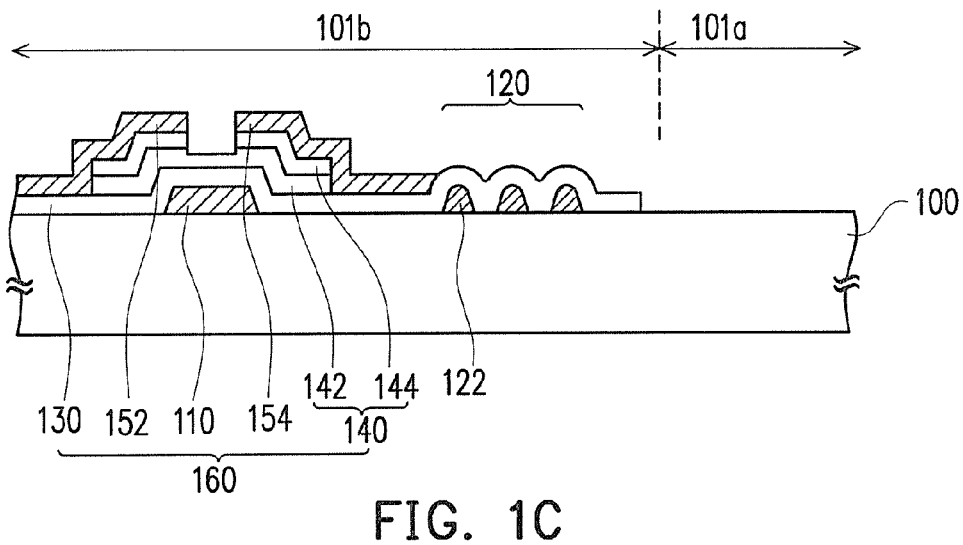

Then, the following step shown in FIG. 1C includes forming a semiconductor layer 140 above the gate electrode 110. The method for forming the semiconductor layer 140 includes: forming an amorphous silicon layer 142; then forming an ohmic contact layer 144 on the amorphous silicon layer 142, wherein the ohmic contact layer 144 is made of N+ doped amorphous silicon, for example; and thereafter, forming a source electrode 152 and a drain electrode 154. The source electrode 152 and the drain electrode 154 for example are made of a material selected from a group consisting of copper, tungsten, chromium, aluminum or a combination thereof. The gate electrode 110, the semiconductor layer 140, the source electrode 152 and the drain electrode 154 constitute a TFT 160.

Figure 1D:
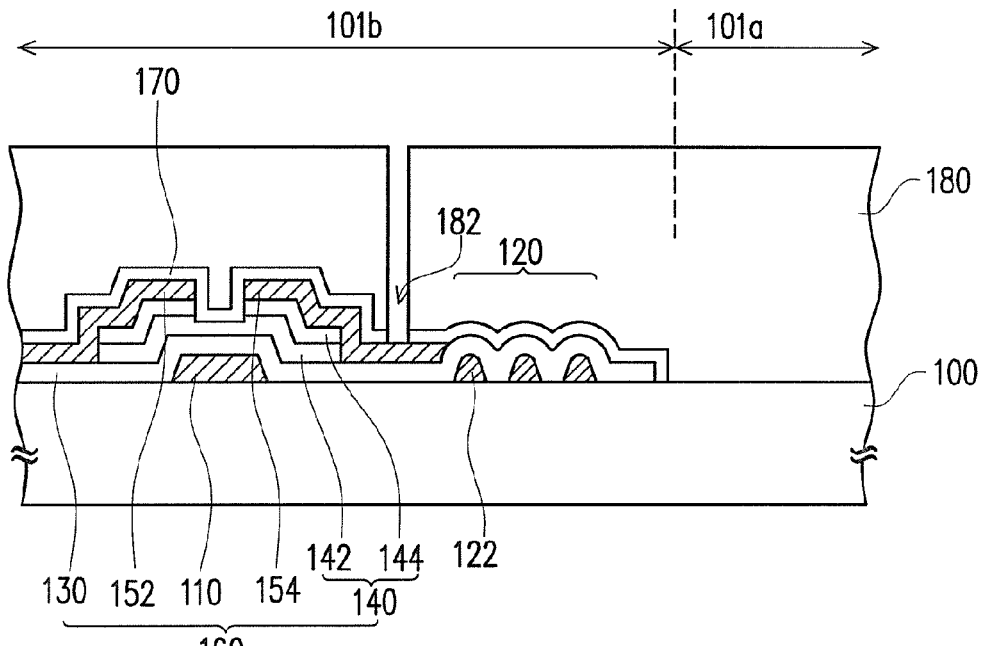

Then, the following step shown in FIG. 1D includes optionally forming a passivation layer 170 over the transparent substrate 100, the passivation layer 170 covering the TFT 160; forming a flatting layer 180; then patterning the flatting layer 180 and the passivation layer 170 to form an contact hole 182 of the flatting layer 180 and the passivation layer 170.

Figure 1E:
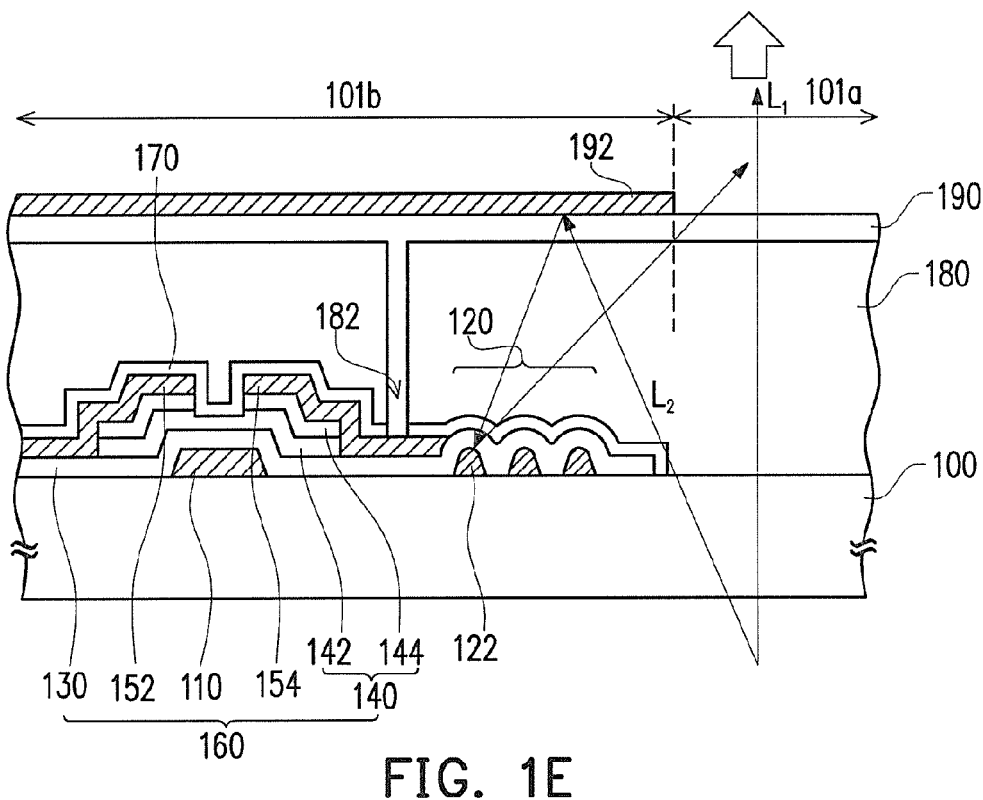

Then, the following step shown in FIG. 1E includes: forming a pixel electrode 190, and forming a reflective layer 192 on the pixel electrode 190. The pixel electrode 190 is electrically connected with the drain electrode 154 via the contact hole 182 of the flatting layer 180 and the passivation layer 170. The area of the pixel structure of the transflective LCD panel covered by the reflective layer 192 is a reflective region 101b, and the area not covered thereby is a transparent region 101a. According to an aspect of the embodiment, the pixel electrode 190 covers the entire flatting layer 180, while according to other aspects of the embodiment, the pixel electrode 190 can be located within the transparent region 101a, being adjacent to the reflective layer 192.

It is to be noted that the TFT 160 and the reflective structure 120 are simultaneously configured according to the first embodiment, while in other embodiments, they are individually configured. For example, the TFT 160 is configured at first, and thereafter the reflective structure 120 is configured at one side of the TFT 160, or the reflective structure 120 is configured at first and then the TFT 160 is configured.

According to the first embodiment, the reflective structure 120 is simultaneously formed at one side of the TFT 160, when the gate electrode 110 is formed. In operation, a backlight module (not shown) provides a backlight, the backlight including a light L1 incident to the transparent region 101a and a light L2 incident to the reflective region 101b. The light L1 is adapted for passing through the transparent region 101a for display, and the light L2 is reflected by the reflective layer 192 to the reflective structure 120, wherein the reflective structure 120 reflects the light L2 out of the panel. Therefore, the efficiency in backlights utilization can be improved.

The Second Embodiment

FIGS. 2A through 2E schematically illustrate a flow chart of fabricating a pixel structure for a transflective LCD panel, according to the second embodiment of the invention. First, the step shown in FIG. 2A includes providing a transparent substrate 200, conducting a lithographic process and an etching process to form a depression 202 at the surface of the transparent substrate 200. The transparent substrate 200 for example is a glass substrate, and the etching liquid used for etching the transparent substrate 200 for example is a hydrogen fluoride solution.

Figure 2A:
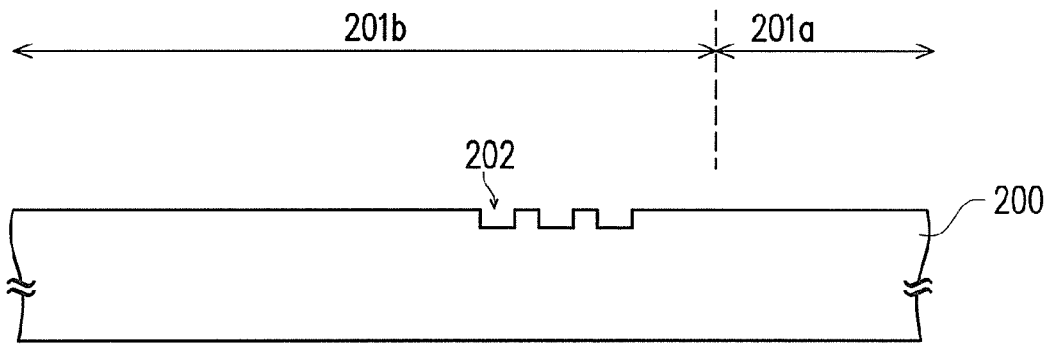
FIGS. 2A through 2E schematically illustrate a flow chart of fabricating a pixel structure for a transflective LCD panel, according to the second embodiment of the invention.
Figure 2B:
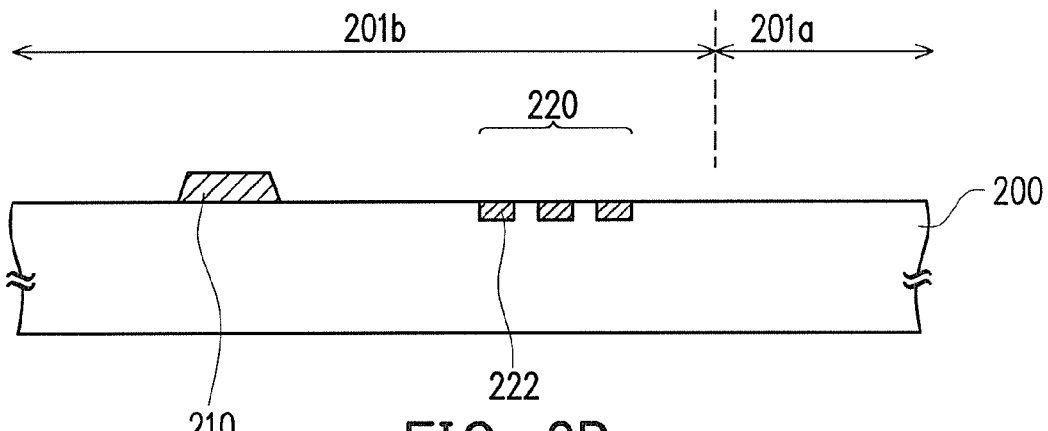

Then, the following step shown in FIG. 2B includes forming a gate electrode 210, and at the same time forming a metallic layer 222 at one side of the gate electrode 210, wherein the metallic layer 222 is lodged into the depression 202 for configuring a reflective structure 220. It is to be noted that the reflective structure 220 and the gate electrode 210 are made of a same material.

Figure 2C:
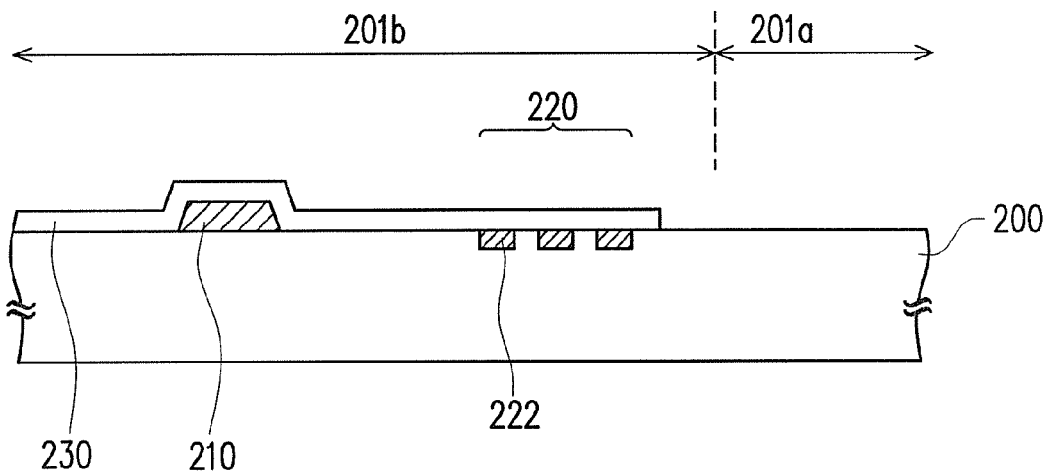

Then, the following step shown in FIG. 2C includes forming a gate insulating layer 230 over the transparent substrate 100 by a CVD method, for example, wherein the gate insulating layer 230 covers the gate electrode 110 and the reflective structure 120. The gate insulating layer 230 is made of silicon dioxide, silicon nitride, or silicon oxynitride, for example.

Figure 2D:
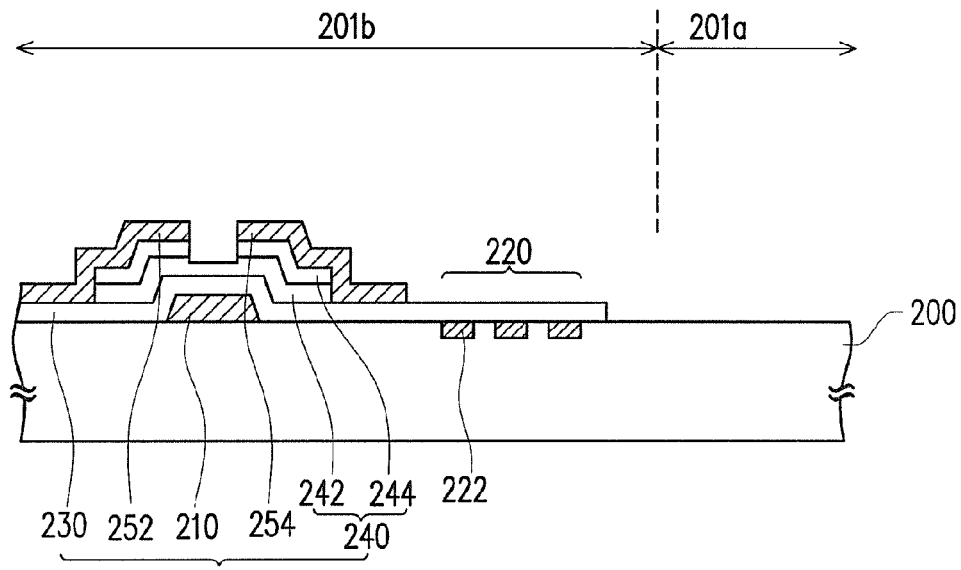

Then, the following step shown in FIG. 2D includes: forming a semiconductor layer 240 on the gate insulating layer 230 and above the gate electrode 210. The method for forming the semiconductor layer 240 includes: forming an amorphous silicon layer 242; then forming an ohmic contact layer 244 on the amorphous silicon layer 242, wherein the ohmic contact layer 244 for example is made of N+ doped amorphous silicon; and thereafter, forming a source electrode 252 and a drain electrode 254. The source electrode 252 and the drain electrode 254 for example are made of a material selected from a group consisting of copper, tungsten, chromium, aluminum or a combination thereof. The gate electrode 210, the semiconductor layer 240, the source electrode 252 and the drain electrode 254 constitute a TFT 260.

Figure 2E:
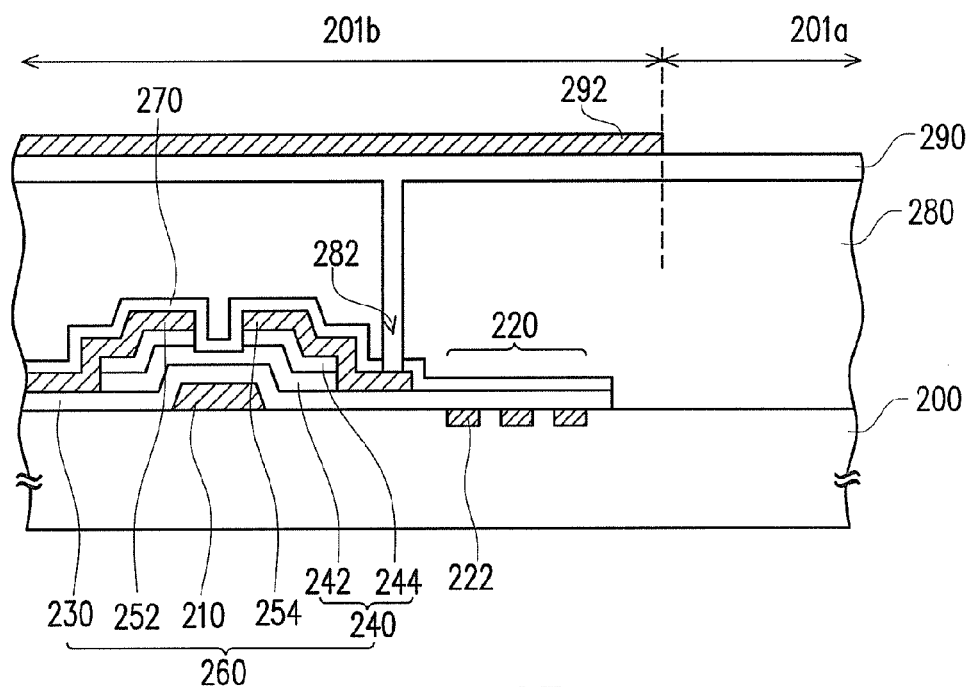

Then, the following step shown in FIG. 2E includes optionally forming a passivation layer 270 over the transparent substrate 200, the passivation layer 270 covering the TFT 260; forming a flatting layer 280; then patterning the flatting layer 280 and the passivation layer 270 to form an contact hole 282 of the flatting layer 280 and the passivation layer 270. The step shown in FIG. 2E further includes forming a pixel electrode 290 and forming a reflective layer 292 on the pixel electrode 290. The pixel electrode 290 is electrically connected with the drain electrode 254 via the contact hole 282 of the flatting layer 280 and the passivation layer 270. The area of the pixel structure of the transflective LCD panel covered by the reflective layer 292 is a reflective region 201b, and the area not covered thereby is a transparent region 201a. According to an aspect of the embodiment, the pixel electrode 290 covers the entire flatting layer 280, while according to other aspects of the embodiment, the pixel electrode 290 is located within the transparent region 201a, adjacent to the reflective layer 292.

According to the second embodiment, a plurality of depressions 202 are formed at the surface of the transparent substrate 200 for the reflective structure 220 to be formed therein when the gate electrode 210 is formed. The reflective structure 220 for example is block-shaped. The reflective structure 220 configured at one side of the TFT 260 is adapted for improving the efficiency in backlights utilization.

The Third Embodiment

FIGS. 3A through 3D schematically illustrate a flow chart of fabricating a pixel structure for a transflective LCD panel, according to the third embodiment of the invention. First, the step shown in FIG. 3A includes providing a transparent substrate 300, and forming gate electrode 310 on the transparent substrate 300.

Figure 3A:
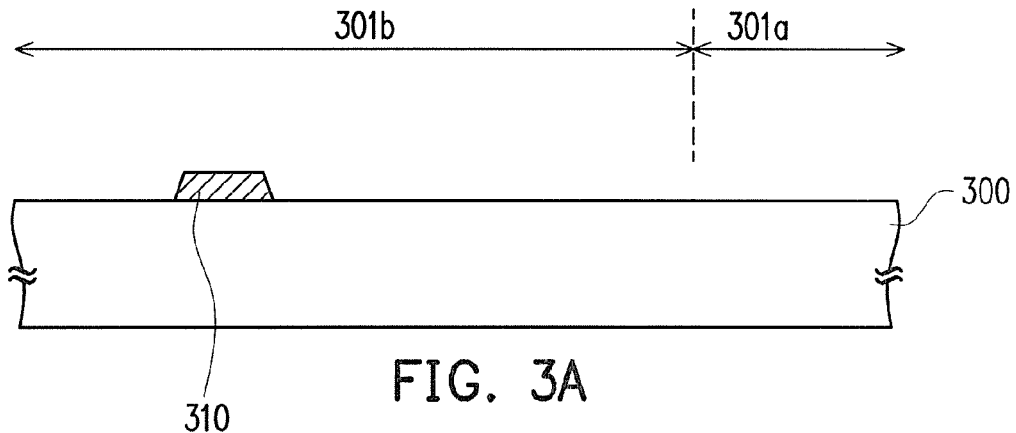
FIGS. 3A through 3D schematically illustrate a flow chart of fabricating a pixel structure for a transflective LCD panel, according to the third embodiment of the invention.
Figure 3B:
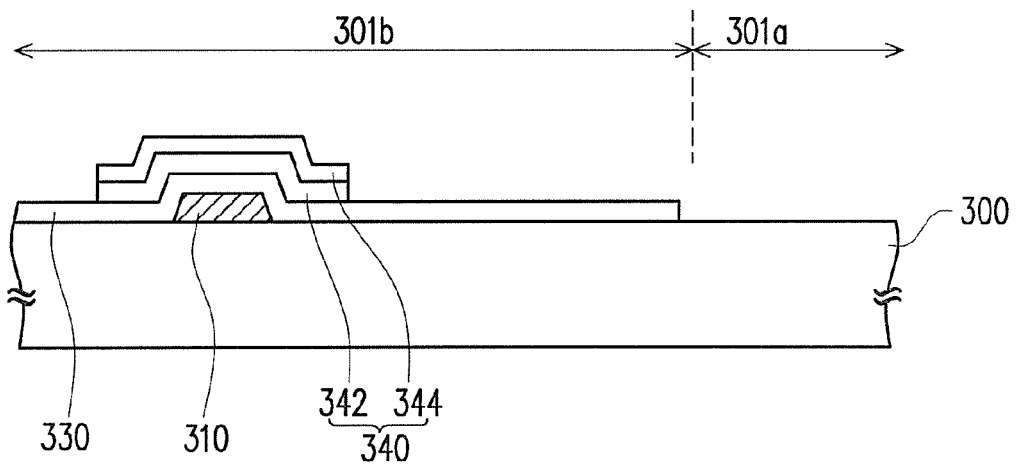

Then, the following step shown in FIG. 3B includes: forming a gate insulating layer 330 over the transparent substrate 300 by a CVD method, for example, wherein the gate insulating layer 330 covers the gate electrode 310; and forming a semiconductor layer 340 above the gate insulating layer 330. The gate insulating layer 330 for example is made of silicon dioxide, silicon nitride or silicon oxynitride. The method for forming the semiconductor layer 340 includes: forming an amorphous silicon layer 342; then forming an ohmic contact layer 344 on the amorphous silicon layer 342, wherein the ohmic contact layer 344 for example is made of N+ doped amorphous silicon.

Figure 3C:
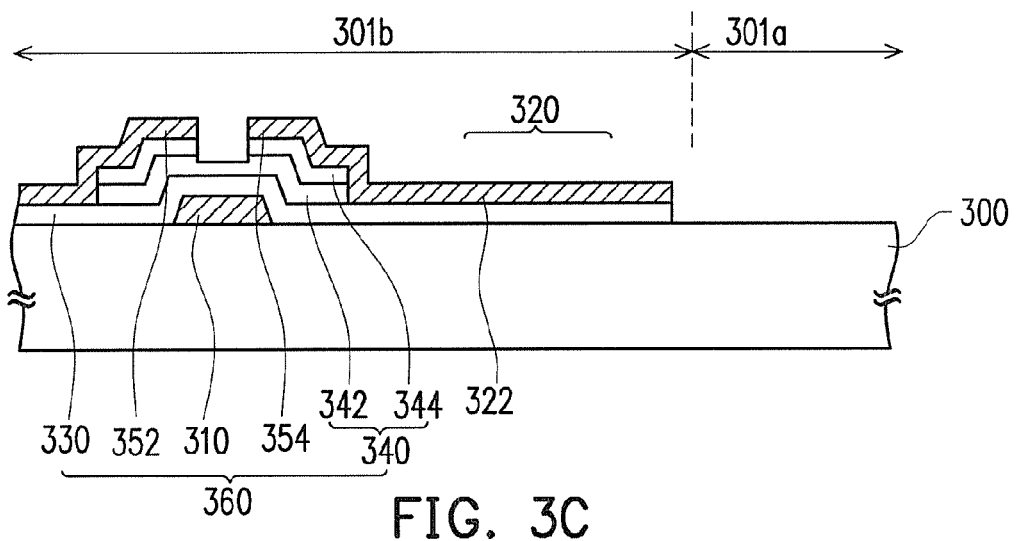

Then, the following step shown in FIG. 3C, includes: forming a source electrode 352, a drain electrode 354, and at the same time forming a metallic layer 322 at one side of the source electrode 352 and the drain electrode 322. The gate electrode 310, the semiconductor layer 340, the source electrode 352 and the drain electrode 354 constitute a TFT 360, and the metallic layer 322 functions as a reflective structure 320. The reflective structure 320 for example is sawtooth-shaped or block-shaped. Further, the reflective structure 320, the source electrode 352 and the drain electrode 354 are made of a same material.

Figure 3D:
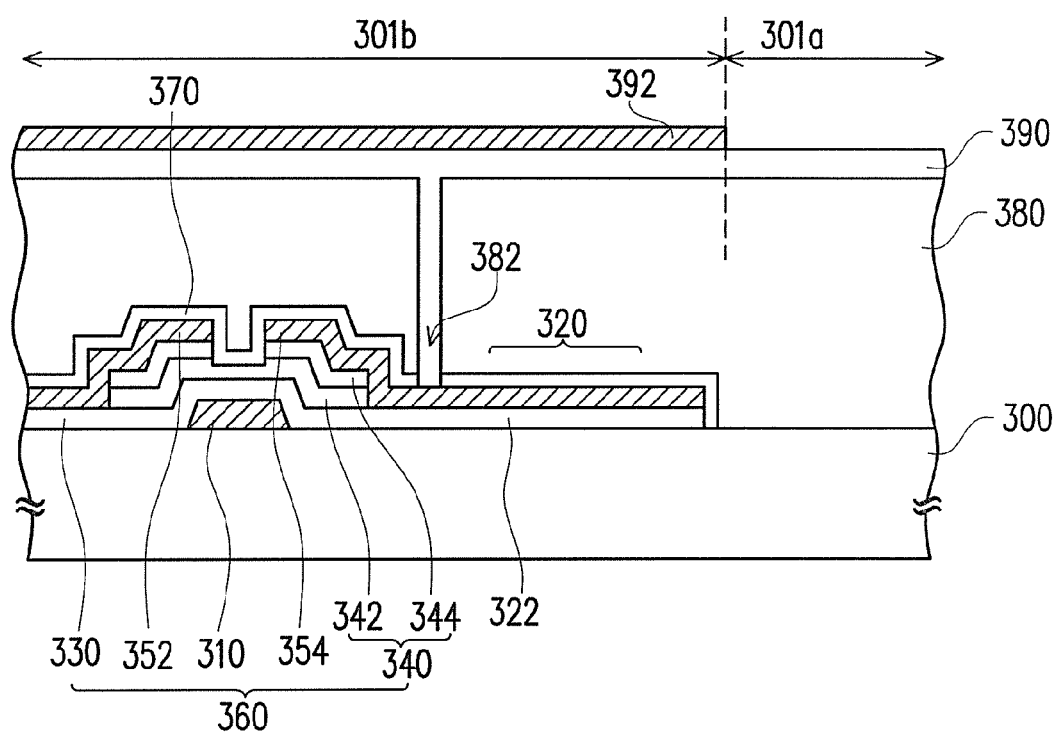

Then, the following step shown in FIG. 3D, includes: optionally forming a passivation layer 370 over the transparent substrate 300, the passivation layer 370 covering the TFT 360 and the metallic layer 322; forming a flatting layer 380; then patterning the flatting layer 380 and the passivation layer 370 to form an contact hole 382 of the flatting layer 380 and the passivation layer 370. The step shown in FIG. 3D further includes forming a pixel electrode 390, and forming a reflective layer 392 on the pixel electrode 390. The pixel electrode 390 is electrically connected with the drain electrode 354 via the contact hole 382 of the flatting layer 380 and the passivation layer 370. The area of the pixel structure of the transflective LCD panel covered by the reflective layer 392 is a reflective region 301b, and the area not covered thereby is a transparent region 301a. According to an aspect of the embodiment, the pixel electrode 390 covers the entire flatting layer 380, while according to other aspects of the embodiment, the pixel electrode 390 is located within the transparent region 301a, adjacent to the reflective layer 392.

According to the third embodiment, a reflective structure 320 is configured on the gate insulating layer 330 at one side of the TFT 360, when the source electrode 352 and the drain electrode 354 are formed. The reflective structure 320 is adapted for improving the efficiency in backlights utilization.

The Fourth Embodiment

FIGS. 4A through 4D schematically illustrate a flow chart of fabricating a pixel structure for a transflective LCD panel, according to the fourth embodiment of the invention. First, the step shown in FIG. 4A includes providing a transparent substrate 400, and forming gate electrode 410 on the transparent substrate 400.

Figure 4A:
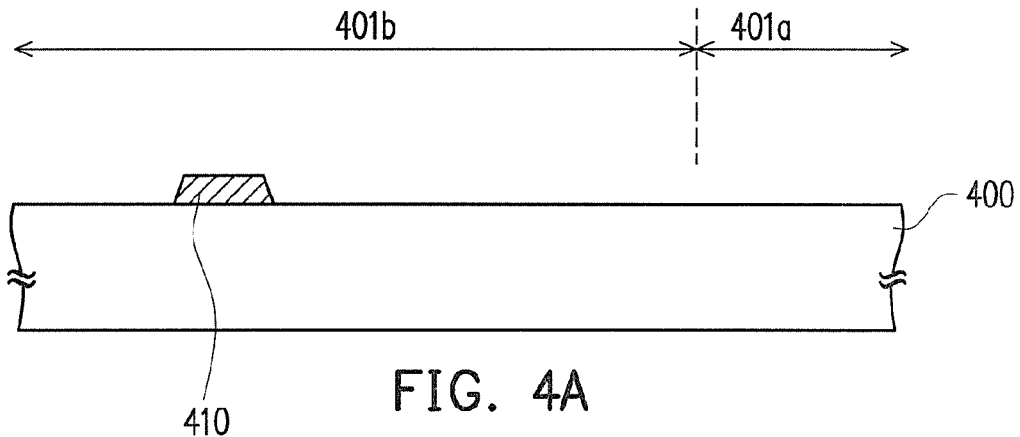
FIGS. 4A through 4D schematically illustrate a flow chart of fabricating a pixel structure for a transflective LCD panel, according to the fourth embodiment of the invention.
Figure 4B:
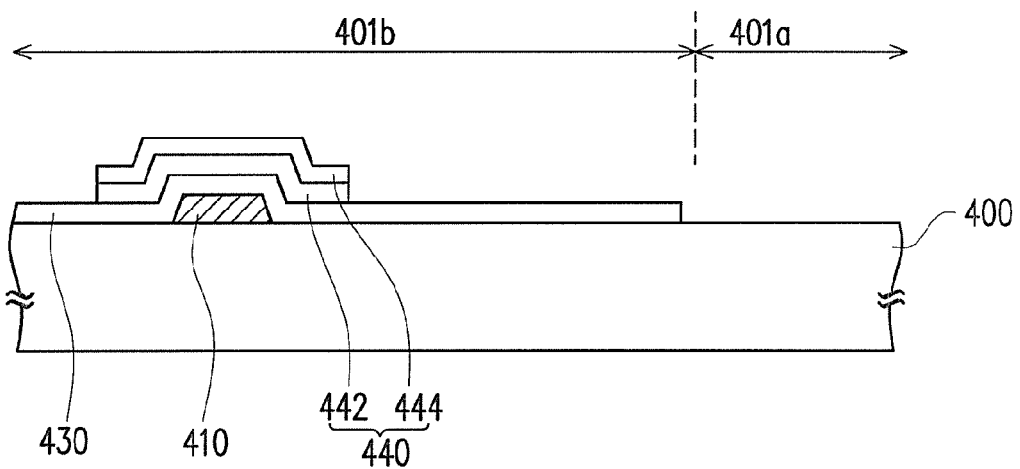

Then, the following step shown in FIG. 4B includes: forming a gate insulating layer 430 over the transparent substrate 400 by a CVD method, for example, wherein the gate insulating layer 430 covers the gate electrode 410; and forming a semiconductor layer 440 above the gate insulating layer 430. The gate insulating layer 430 for example is made of silicon dioxide, silicon nitride or silicon oxynitride. The method for forming the semiconductor layer 440 includes: forming an amorphous silicon layer 442; then forming an ohmic contact layer 444 on the amorphous silicon layer 442, wherein the ohmic contact layer 444 for example is made of N+ doped amorphous silicon.

Figure 4C:
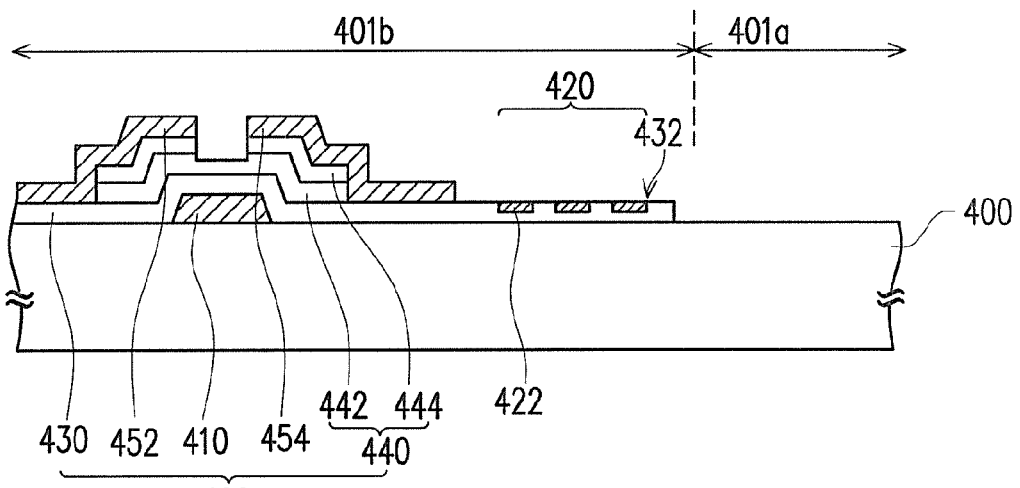

Then, the following step shown in FIG. 4C, includes: conducting a lithographic process and an etching process to form a depression 432 on the gate insulating layer 430; then simultaneously forming a source electrode 452, a drain electrode 454 and a metallic layer 422, wherein the source electrode 452 and the drain electrode 454 are located on the gate electrode 410, and the metallic layer 422 is lodged in the depression 432 for configuring a reflective structure 420. The gate electrode 410, the semiconductor layer 440, the source electrode 452 and the drain electrode 454 constitute a TFT 460. The reflective structure 420 for example is sawtooth-shaped or block-shaped. Further, the reflective structure 420, the source electrode 420 and the drain electrode 454 are made of a same material.

Figure 4D:
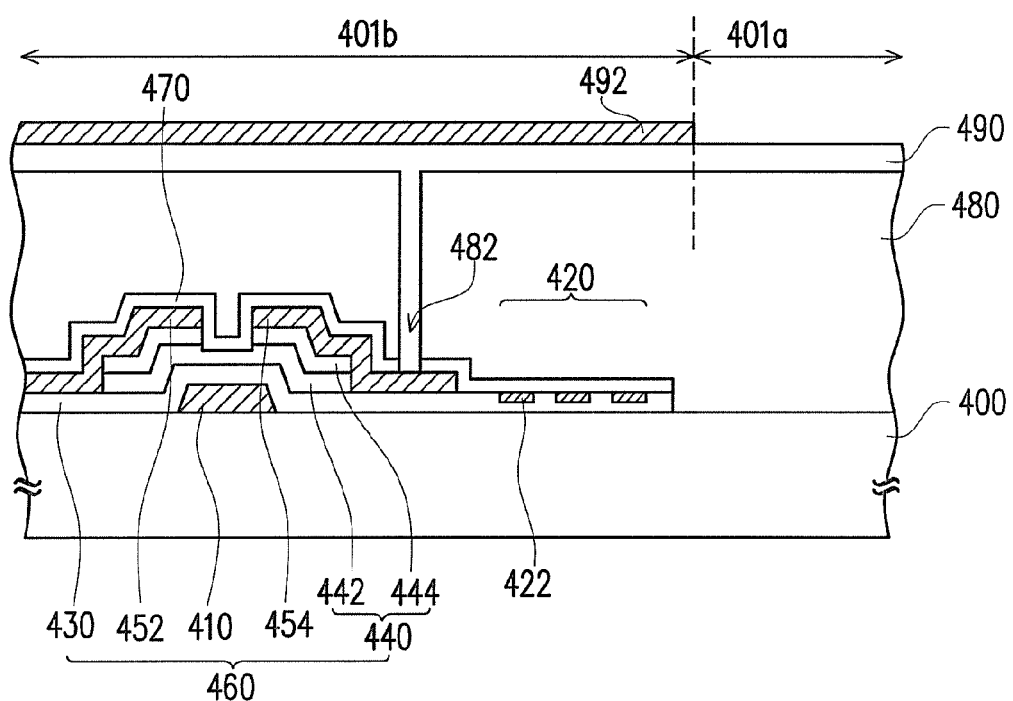

Then, the following step shown in FIG. 4D includes: optionally forming a passivation layer 470 over the transparent substrate 400, the passivation layer 470 covering the TFT 460 and the metallic layer 422; forming a flatting layer 480; then patterning the flatting layer 480 and the passivation layer 470 to form an contact hole 482 of the flatting layer 480 and the passivation layer 470. The step shown in FIG. 4D further includes forming a pixel electrode 490, and forming a reflective layer 492 on the pixel electrode 490. The pixel electrode 490 is electrically connected with the drain electrode 454 via the contact hole 482 of the flatting layer 480 and the passivation layer 470. The area of the pixel structure of the transflective LCD panel covered by the reflective layer 492 is a reflective region 401b, and the area not covered thereby is a transparent region 401a. According to an aspect of the embodiment, the pixel electrode 490 covers the entire flatting layer 480, while according to other aspects of the embodiment, the pixel electrode 490 is located within the transparent region 401a, adjacent to the reflective layer 492.

According to the third embodiment, the depression 432 is formed on the gate insulating layer 430 for configuring a reflective structure 420 lodged in the depression 432 of the gate insulating layer 430 at one side of the TFT 460, when the source electrode 452 and the drain electrode 454 are formed. The reflective structure 420 is adapted for improving the efficiency in backlights utilization.

The Fifth Embodiment

FIGS. 5A through 5D schematically illustrate a flow chart of fabricating a pixel structure for a transflective LCD panel, according to the fifth embodiment of the invention. First, the step shown in FIG. 5A includes providing a transparent substrate 500, and forming gate electrode 510 and a metallic layer 522 on the transparent substrate 500, wherein the metallic layer 522 is located at one side of the gate electrode 510. According to an aspect of the embodiment, a method for forming the metallic layer 522 is by directly forming a patterned metallic layer on the transparent substrate 500 as shown in FIG. 1. Another method for forming the metallic layer 522 can be, as shown in FIG. 2, by conducting a lithographic process and an etching process to form a depression (not shown) for receiving the metallic layer 522 when forming the gate electrode 510.

Figure 5A:
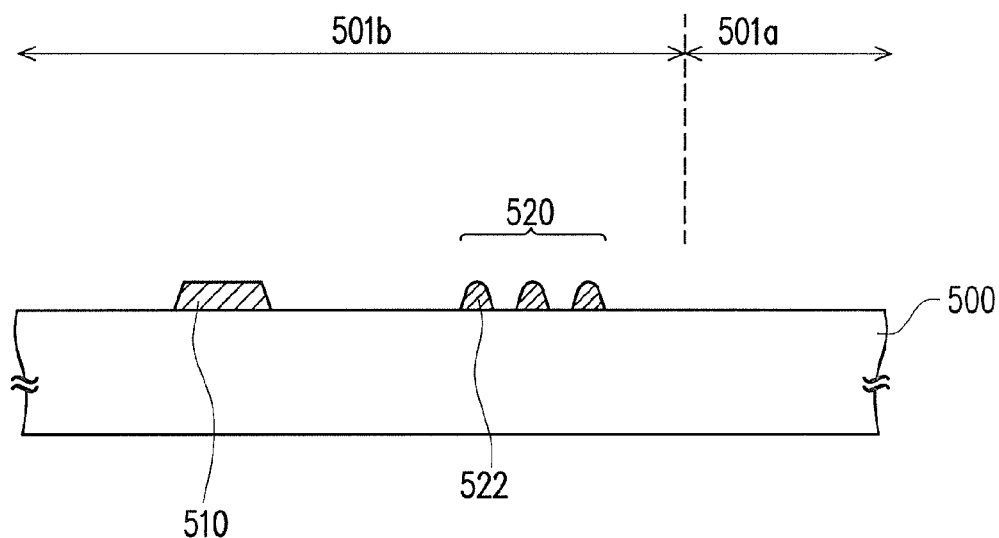
FIGS. 5A through 5D schematically illustrate a flow chart of fabricating a pixel structure for a transflective LCD panel, according to the fifth embodiment of the invention.
Figure 5B:
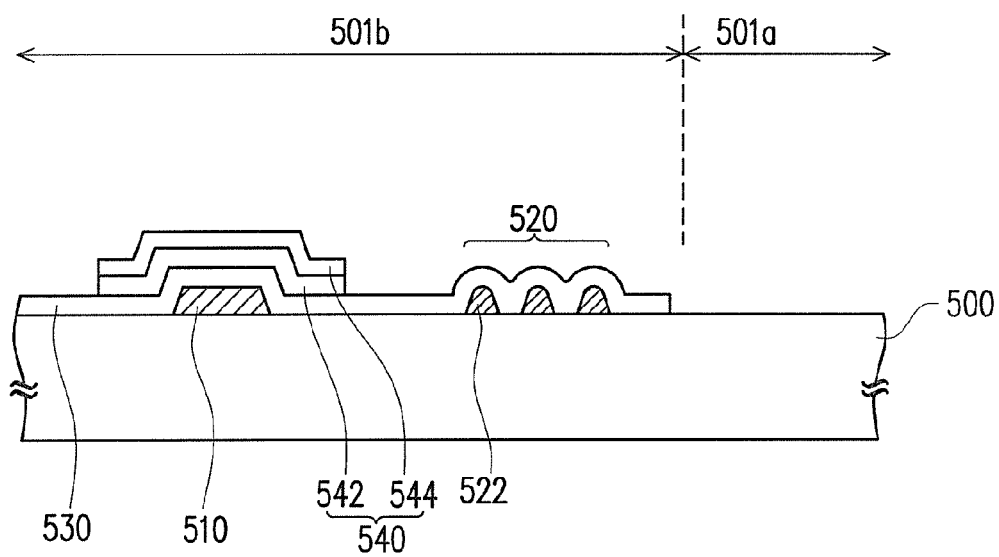

Then, the following step shown in FIG. 5B includes: forming a gate insulating layer 530 over the transparent substrate 500 by a CVD method, for example, wherein the gate insulating layer 530 covers the gate electrode 510 and the metallic layer 522; and forming a semiconductor layer 540 on the gate insulating layer 530 and above the gate electrode 510. The gate insulating layer 530 for example is made of silicon dioxide, silicon nitride or silicon oxynitride. The method for forming the semiconductor layer 540 includes: forming an amorphous silicon layer 542; then forming an ohmic contact layer 544, wherein the ohmic contact layer 544 for example is made of N+ doped amorphous silicon.

Figure 5C:
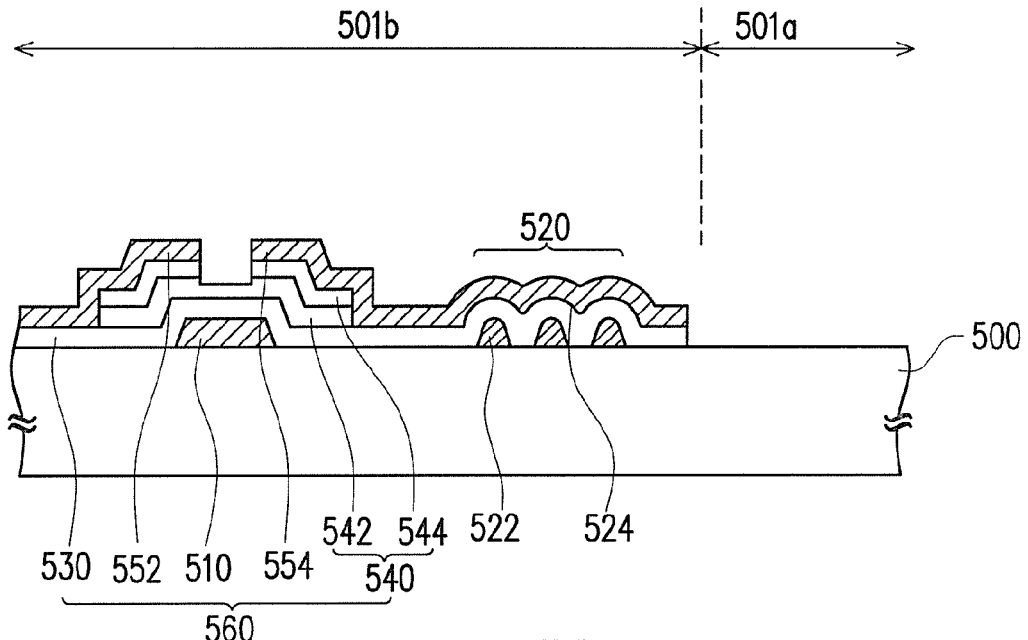

Then, the following step shown in FIG. 5C includes: forming a source electrode 552, a drain electrode 554, and at the same time forming a metallic layer 522, wherein the source electrode 552 and the drain electrode 554 are above the gate electrode 510, and the metallic layer 524 is above the metallic layer 522. The gate electrode 510, the semiconductor layer 540, the source electrode 552 and the drain electrode 554 constitute a TFT 560, and the metallic layer 522 and the metallic layer 524 function as a reflective structure 320. Further, the metallic layer 522 and the gate electrode 510 are made of a same material, while the metallic layer 524 and the source electrode 552, the drain electrode 554 are made of a same material. The metallic layer 522 and the metallic layer 524 for example are sawtooth-shaped or block-shaped.

Moreover, according to the embodiment, the method for forming the metallic layer 524 can also be, as shown in FIG. 4, by conducting a lithographic process and an etching process to form a depression (not shown) on the gate insulating layer 530, and then simultaneously forming the source electrode 552, the drain electrode 554 and the metallic layer 524, for receiving the metallic layer 524 in the depression.

Figure 5D:
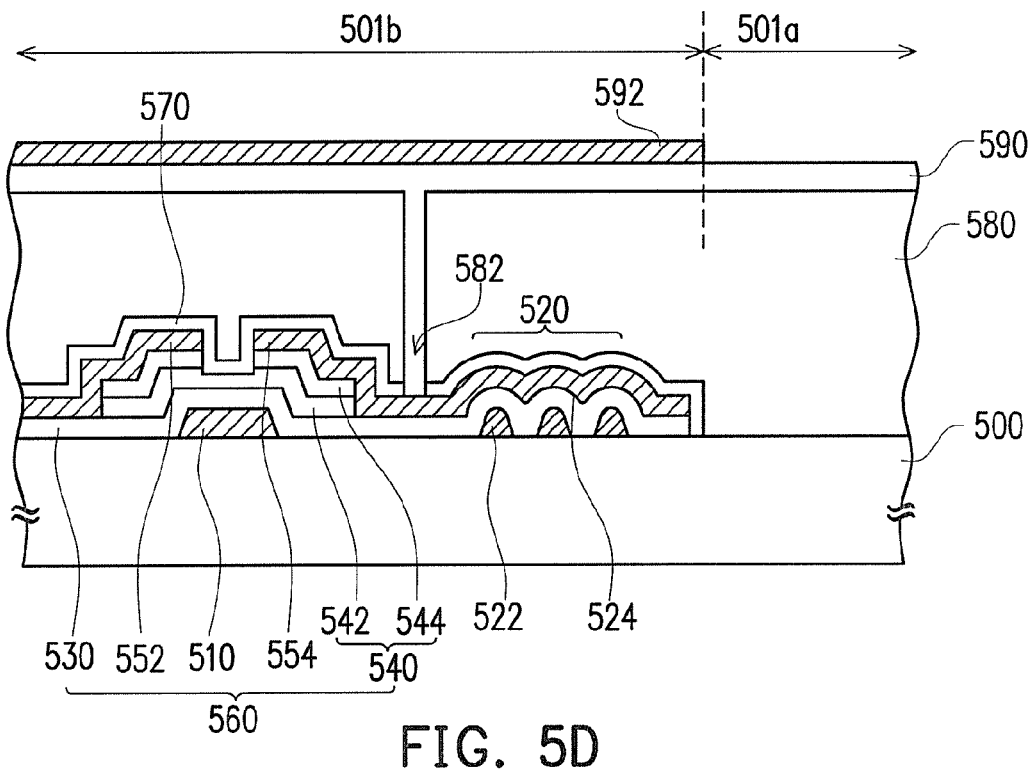

Then, the following step shown in FIG. 5D includes: optionally forming a passivation layer 570 over the transparent substrate 500, the passivation layer 570 covering the TFT 560 and the metallic layer 522; forming a flatting layer 580; then patterning the flatting layer 580 and the passivation layer 570 to form an contact hole 582 of the flatting layer 580 and the passivation layer 570. The step shown in FIG. 5D further includes forming a pixel electrode 590, and forming a reflective layer 592 on the pixel electrode 590. The pixel electrode 590 is electrically connected with the drain electrode 554 via the contact hole 582 of the flatting layer 580 and the passivation layer 570. The area of the pixel structure of the transflective LCD panel covered by the reflective layer 592 is a reflective region 501b, and the area not covered thereby is a transparent region 501a. According to an aspect of the embodiment, the pixel electrode 590 covers the entire flatting layer 580, while according to other aspects of the embodiment, the pixel electrode 590 is located within the transparent region 501a, adjacent to the reflective layer 592.

According to the fifth embodiment, the reflective structure 520 for example is a dual-layer structure configured simultaneously with the gate electrode 510, the source electrode 522 and the drain electrode 554. The reflective structure 520 is located at one side of the TFT 560 for improving the efficiency in backlights utilization.

According to the above-described embodiments, combined with an optical mask processing, the present invention is adapted for fabricating a reflective structure at one side of a TFT, for improving the efficiency in backlights utilization. The reflective structure can be formed simultaneously with the gate, and can either protrude from or lodge into the substrate surface. Further, the reflective structure can also be formed simultaneously with the source/drain electrode, and can either protrude from or lodge into the substrate surface. Furthermore, the reflective structure can also be a dual-layer structure, or even a combination of the above-mentioned types.

In summary, the pixel structure for a transflective LCD panel and the fabricating method thereof according to the present invention have at least the following advantages and features:
1. A reflective structure is disposed on at least one side of the TFT, thus improving the efficiency in backlights utilization;
2. The reflective structure is formed at one side of the TFT while the TFT is formed, thereby excluding additional optical masks and process, and saving production cost.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A pixel structure for a transflective LCD having a transparent region and a reflective region, the pixel structure comprising:
   a transparent substrate, having at least one depression;
   a TFT, disposed in the reflective region of the transparent substrate;
   at least one reflective structure, configured at one side of the TFT on the transparent substrate, and located in the reflective region of the transparent substrate, wherein the reflective structure comprises a first metallic layer, and the first metallic layer is filled in the at least one depression;
   a passivation layer, disposed over the transparent substrate and covering the TFT and the reflective structure;
   a pixel electrode, disposed above the TFT and the reflective structure, and at least located in the transparent region, the pixel electrode being electrically connected to the TFT; and
   a reflective layer, disposed above the TFT and the reflective structure, and located in the reflective region wherein the TFT comprises: a gate electrode, a gate insulating layer, disposed over the transparent substrate and covering the gate electrode; a source/drain electrode, disposed on the semiconductor layer; wherein the gate electrode comprises the first metallic layer.

2. The pixel structure according to claim 1, wherein the gate insulating layer extends outside the TFT and covers the first metallic layer.

3. The pixel structure according to claim 1, wherein the depression is formed on a surface of the transparent substrate.

4. The pixel structure according to claim 1, further comprising a flatting layer, disposed between the pixel electrode and the transparent substrate, and covering the TFT and the reflective structure.

* * * * *